March 2, 1948.     H. J. BRANER     2,437,151
ELECTRIC SOLDERING APPARATUS
Filed June 14, 1945
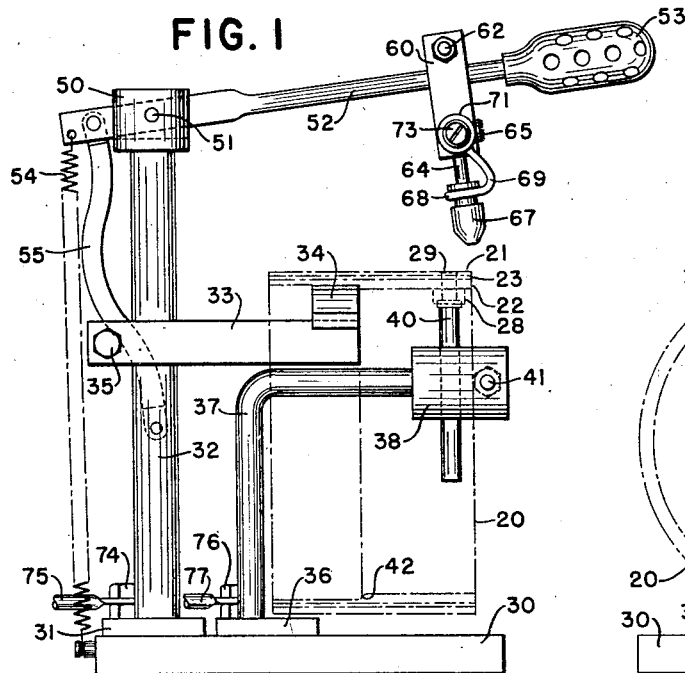
INVENTOR
HENRY J. BRANER
BY
Carl Beust
HIS ATTORNEY Patented Mar. 2, 1948

2,437,151

UNITED STATES PATENT OFFICE 2,437,151

ELECTRIC SOLDERING APPARATUS

Henry J. Braner, Dayton, Ohio, assignor to The National Cash Register Company, Dayton, Ohio, a corporation of Maryland Application June 14, 1945, Serial No. 599,457

1 Claim. (Cl. 219—12)

This invention relates to an apparatus for holding work to be soldered and for producing and applying the required heat to the area of the work which is to be soldered. More specifically, this invention relates to an electric soldering fixture or apparatus whereby a low-voltage current is carried through certain elements of the fixture, the electric circuit being normally open but adapted to be closed by contact of a soldering tip with the area of the work to be soldered to supply the necessary and required heat to said area.

It is therefore an object of this invention to produce a novel electric soldering fixture, easy to operate and efficient in its operation from the standpoint of cost in production of the work to be soldered.

Another object is to produce a novel electric soldering fixture adapted to carry a normally open electric circuit which may be closed by a simple manipulation of a soldering tip.

A further object is to provide a novel electric soldering fixture or apparatus with a movable soldering tip adapted to be moved into contact with the area of the work to be soldered.

A still further object is to provide such a fixture with a soldering tip so constructed and mounted as to automatically adjust itself to make proper contact with the work area when moved from a non-operable or normal position into an operable position by a manually operable lever.

Another object is to provide an electric soldering fixture with a work-supporting means, one portion of which is adapted to carry an electric circuit, normally open, but adapted to be closed and completed through said one portion upon contact of a soldering tip with the work at a point opposite the point where the work rests on said one portion of the supporting means.

With these and incidental objects in view, the invention includes certain novel features of construction and combinations of parts, the essential elements of which are set forth in appended claim and a preferred form or embodiment of which is hereinafter described with reference to the drawing which accompanies and forms a part of this specification.

Of said drawing:

Fig. 1 is a side elevation of the electric soldering fixture or apparatus.

Fig. 2 is a front elevation of the same, both Figs. 1 and 2 showing the work in dot-and-dash lines.

Fig. 3 is an enlarged detail view showing the soldering tip and the manner of supporting the same.

Fig. 4 is a further enlarged view showing the construction of the work to be soldered, and also showing the movable soldering tip in contact with the work at the area to be soldered, and further illustrates that portion of the work-supporting means through which the electric circuit is completed to heat the area of the work to be soldered when the soldering tip is moved into contact therewith.

Fig. 5 is a section taken on line 5—5 of Fig. 3 looking in the direction of the arrows and shows the construction of the soldering tip and how it is mounted.

Detailed description

As shown in Figs. 1, 2, and 4, the work to be soldered in connection with the present invention is a laminated collar or cylinder. This work is shown in dot-and-dash lines in Figs. 1 and 2 and is designated generally by the reference number 20.

It is believed that a detailed description of the work 20 will be beneficial at this particular point in this specification, and therefore an enlarged section of the work 20 at the area to be heated and soldered is clearly shown in Fig. 4. The work 20 comprises a metal outer layer 21, a metal inner layer 22, and an intermediate layer 23 made of electrical insulating material.

Riveted to the outer layer 21 and projecting through said layer and the layers 23 and 22 is a stud 24 having a head 25. Secured to the stud 24 is an electric wire terminal clip or eye 26, which is attached to an electric wire 27. To electrically insulate the stud 24 from the inner layer 22, there is provided a shouldered bushing 28 of electrical insulating material. This bushing 28 is recessed to receive the eye 26 and head 25 of the stud and is also slotted to allow the wire 27 to project outside the bushing.

The above construction permits electric current to be transmitted from a source of supply, through wire 27, eye 26, and stud 24, to the outer layer 21 of the work 20. The insulating layer 23 and the bushing 28 prevent any electrical connection between the outer layer 21 and the inner layer 22.

To insure a perfect contact for an electrical circuit between the stud 24 and the layer 21, solder is applied to the rivet joint of the stud 24 and the layer 21 at 29.

In order to produce a satisfactory solder joint, it is necessary to heat the area to be soldered, and, in the present case herein illustrated, that area is the riveted end of the stud 24 and the adjacent area of the layer 21 of the work 20, which surrounds the stud 24.

The fixture or apparatus for holding the work 20 and for producing the required heating of the area to be soldered will now be described in detail. Said apparatus includes a base 30 made of electrical insulating material such as fiber. Rigidly secured to the base 30 by means of metal plate 31 is a vertical post 32, which carries a bar 33. Secured to the projecting end of the bar 33 is a work-supporting block 34. The bar 33 and the block 34 are both made of electrical insulating material such as fiber.

The bar 33, at its left end (Fig. 1), has a vertical slot (not shown), and a bolt 35 is provided to clamp the bar 33 to the post 32 at any desirable adjusted distance above the base 30.

Also rigidly secured to the base 30 by a metal plate 36 is another post 37, bent at right angles, the horizontal portion of which has secured thereto a head 38 having a slot 39. The head 38 carries a rod 40, preferably made of Nichrome, adapted to be set and clamped tightly by a bolt 41, so that the top of the rod 40 will be contacted by the head 25 of the stud 24 (Figs. 1, 2, and 4) when the work 20 is placed in the position shown, on the supporting block 34 of the bar 33. A shoulder 42 on the inside of the inner layer 22 of the work 20 is placed against the edge of the block 34, so as to properly position the head 25 of the stud 24 with relation to the top of the rod 40.

Thus, the block 34 supports the work 20 and locates the same for additional support by the rod 40.

The post 32 has secured thereto a slotted head 50, in which is pivoted, by means of a pin 51, a lever 52 having a handle 53 made of electrical insulating material. The handle 53 is provided with a plurality of holes, which aid in eliminating heat therefrom. The lever 52 is held normally in the position shown in Fig. 1 by a spring 54 attached to the end thereof and to the base 30. An electric current-conducting flexible strap 55 is secured firmly at its ends to the post 32 and to the lever 52 to prevent burning of the pin 51 when electric current is transmitted from the post 32 to the lever 52.

A block 60 is slidably mounted on the lever 52. The upper end of the block 60 has a slot 61, and, by means of a bolt 62, the block may be clamped tightly on the lever 52 at any desired position. The block 60 has a hole 63 extending all the way through the block to receive a carbon stick 64, which is held in proper position by a set screw 65. The lower end of the carbon stick 64 projects into a hole 66 of a soldering copper tip 67, which is carried by a fork 68 of a bail 69. The fork 68 engages an annular neck 70 of the tip 67. The bail 69 is supported by arms 71, which swing freely on porcelain collars 72 mounted opposite each other on the block 60 by screws 73.

The fit between the carbon stick 64 and the hole 66 of the copper tip 67 is a free or sliding fit, which causes the tip to heat up rapidly.

Rigidly secured to the plate 31 (Fig. 1) by means of a terminal 74 is an electric wire 75, which comes from one side of a source of low-voltage current supply. Secured to the plate 36 (Figs. 1 and 2) by means of a terminal 76 is an electric wire 77, which comes from the other side of a source of low-voltage current supply.

In practice, it has been found that 4 volts is sufficient to produce the necessary heating of the area to be soldered, but the invention is not limited to the use of exactly 4 volts.

*Operation*

The operation of the soldering apparatus will now be described. The work 20 is first placed in position on the support block 34 with the shoulder 42 of the work 20 against the edge of the block 34, so as to definitely locate the head 25 of the stud 24 directly above the rod 40, so that the head 25 will rest on said rod 40.

Next, the operator grasps the handle 53 and rocks the lever 52 clockwise (Fig. 1) until the soldering tip 67 contacts the riveted end of the stud 24, as shown in Fig. 4. The tip 67 is held in this position for a few seconds.

The contacting of the tip 67 with the stud 24 closes a normally open low-voltage electric circuit which produces the necessary heating of the area 29 to be soldered.

The operator now applies solder, from a stick or roll, to the area 29, which solder immediately melts, due to the parts having been properly heated, and forms a permanent tight joint between the stud 24 and the outer layer 21 of the work 20. Thus, when the work 20 is used in its intended manner, there will be no sparking or arcing at the joint of the stud 24 and the layer 21 when a circuit is completed through the layer 21, the stud 24, the eye 26, and the wire 27.

After the soldering is completed, the operator raises the handle 53 to remove the soldering tip 67 from the stud 24. If the operator fully raises the handle 53, the spring 54 then retains the lever 52 and attached parts in normal positions, shown in Fig. 1. If the operator releases the handle 53 before fully restoring the same, then the spring 54 acts as the restoring member due to its having been put under tension upon the clockwise movement of the lever 52.

The normally open circuit, through the above-described apparatus, which is closed when the tip 67 is moved into contact with the stud 24 by the lever 52, is as follows: from one side of a low-voltage supply through wire 75, terminal 74, plate 31, post 32, strap 55, lever 52, block 60, carbon stick 64, soldering tip 67, stud 24, rod 40, post 37, plate 36, terminal 76, and wire 77 to the other side of the low-voltage supply.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claim which follows.

What is claimed is:

In an apparatus for supporting electrically conductive work to be soldered, the combination of a base constructed of electrically non-conducting material; a first electrically conductive member supported on said base, said member having one terminal of a source of electrical energy connected thereto; an electrically conductive head on said member; an electrically conductive rod to support said work and movably mounted in said head to accommodate work of varying size and character; means for clamping the rod in any selected position; a second electrically conductive member mounted on said base, said second member having a terminal of a source of electrical energy connected thereto; an electrically conductive pivoted means supported on said second member; a flexible conductor connected between the second member and one end of the pivoted means; an electrical conductive bracket adjustably mounted adjacent the free end of the pivoted member; an electrode carried by the bracket; means to clamp the bracket to the pivoted means in any selected position corresponding to the position in which said rod is positioned in said head; resilient means to normally maintain the pivoted means in a position in which the electrode is disengaged from the work thereby holding the electrical circuit through said electrically conducting elements open; an electrically non-conducting support for the work adjustably mounted on said first member to accommodate work of varying sizes and character; and a handle on the free end of the pivoted means to enable the operator to lower the electrode into contact with the work on the rod to thereby close said circuit through the work and cause the work to be heated to a soldering temperature.

HENRY J. BRANER.

REFERENCES CITED

The following references are of record in the file of this patent:

UNITED STATES PATENTS

| Number | Name | Date |
| --- | --- | --- |
| 1,514,430 | Burns et al. | Nov. 4, 1924 |
| 1,580,794 | Seltzer | Apr. 13, 1926 |
| 2,348,884 | Dewees | May 16, 1944 |